Apr. 17, 1923.
G. H. LARSSON
1,452,082
ADJUSTABLE TOOL HOLDER
Filed July 29, 1922
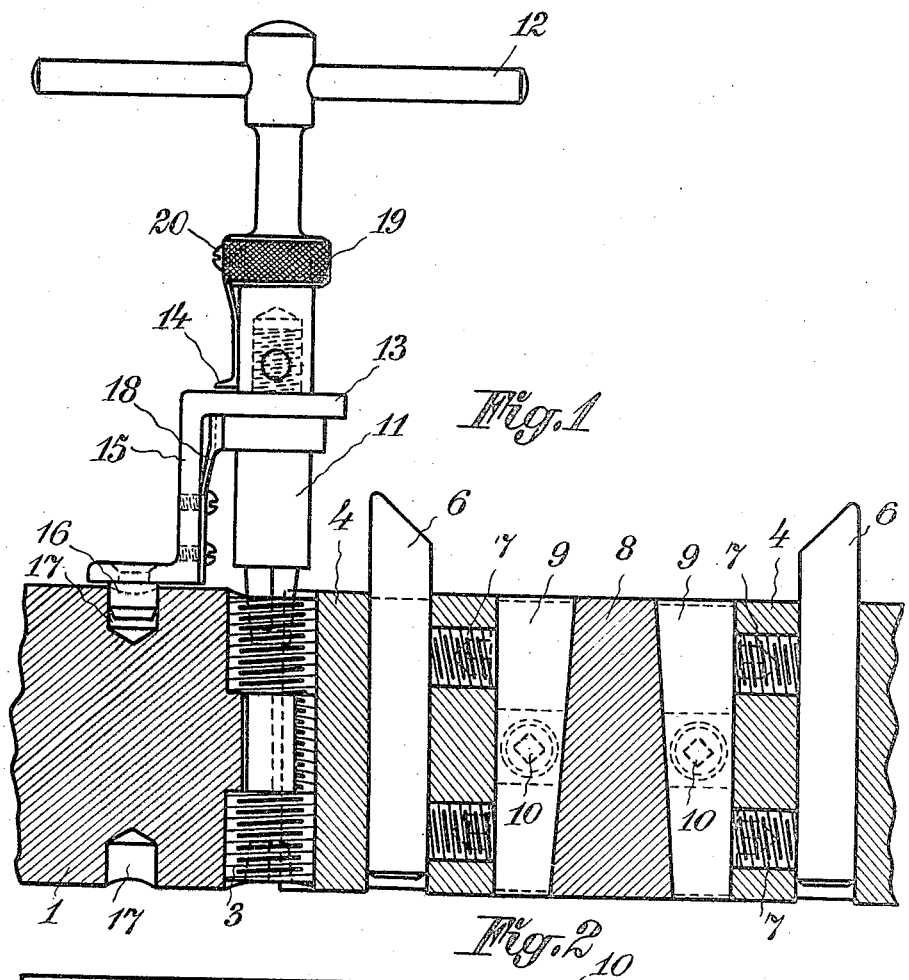
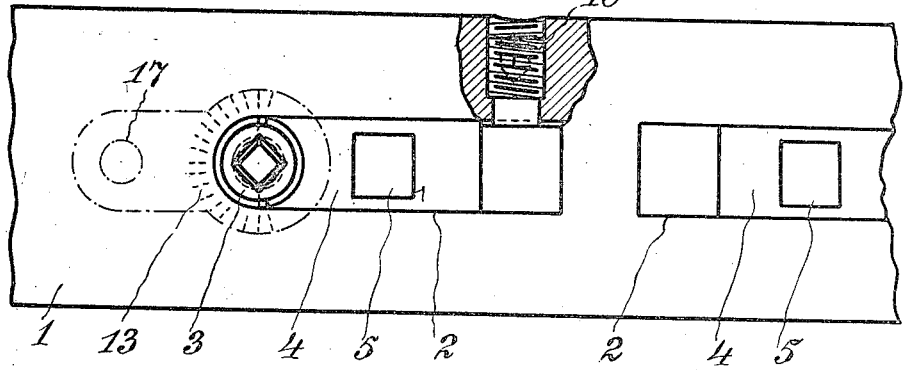
Inventor
G. H. Larsson
his Atty Patented Apr. 17, 1923.

1,452,082

UNITED STATES PATENT OFFICE.

GUSTAF HENNING LARSSON, OF SVEDALA, SWEDEN.

ADJUSTABLE TOOL HOLDER.

Application filed July 29, 1922. Serial No. 578,451.

*To all whom it may concern:*

Be it known that I, GUSTAF HENNING LARSSON, a citizen of Sweden, residing at Svedala, in the Kingdom of Sweden, have invented certain new and useful Improvements in Adjustable Tool Holders; and I do hereby declare the following to be a full, clear, and exact description of the invention.

The object of the invention is to provide an adjustable tool holder for lathes and drilling machines comprising a spindle, for instance a boring-bar with a pin mounted transversely in a slot of said spindle, said pin being rotatable but not movable in longitudinal direction and provided with one or more threads which coact with threads on blocks arranged in the slot of the spindle, said blocks serving as tool holders. A further object of the invention is to arrange the tool-holding block or blocks to be inserted together with the tool fastened thereto in the slot of the spindle, so that once fixed the tool requires no further adjustment, as the controlling of the protruding length of the tool is obtained by rotating the above named pin, and between two tool-holding blocks are arranged wedge-shaped members for securing a tight fitting of the blocks.

Another object of the invention is to provide the above named pin with a removable key in a known manner said key being provided with a graduated table coacting with a pointer, said table being arranged to be set in fixed relation to the boring-bar when the key is inserted in the pin.

In the accompanying drawings, showing one embodiment of the invention, Figure 1 is a longitudinal section through a part of the boring-bar with only one controlling key shown in elevation, the other adjusting pin for the second tool not being shown, and Figure 2 is a side view of the boring-bar showing the fixing screw for one of the wedge-like members in section and with the controlling key removed.

According to the drawings 1 is the boring-bar provided with transverse slots 2, at the one end of which is mounted a pin 3. This pin 3 is turned down in the middle and at both ends provided with threads which threads serve both to coact with threads in the tool-holding blocks 4 and to prevent a movement in a longitudinal direction of the pin 3 by forming shoulders which rest upon corresponding shoulders arranged in the slot of the boring-bar. Each block 4 has a square or round hole 5 into which the tool 6 may be inserted. This tool 6 is held in place by set screws 7, so that the blocks with their tools as a unit may be inserted in the slot 2. The slot 2 is divided into two or more parts by a wedge 8 integral with the boring-bar 1. Between this wedge 8 and the tool-holding blocks 4 are wedge-shaped members 9 arranged, the one side of said members being parallel with the side of the wedge 8 and the other side being parallel with the adjacent side of the tool-holding block, the latter being parallel with the pin 3, so that the blocks may slide along the members 9 without interference of the wedge action of the latter.

After the tool-holding blocks and the wedge-shaped members have been inserted in the slots of the boring bar the wedge-shaped members are securely fixed by means of set screws 10.

The threaded pin 3 is rotatable by means of a key 11 of known type, the one end of said key fitting in a corresponding socket of the pin and the other end being provided with a handle 12. This key 11 carries also a graduated table 13 and an adjustable pointer 14 arranged above said table. This table 13 is integral with a bracket 15 being provided with a stud 16, which stud fits into an appropriate socket 17 of the boring-bar, so that the graduated table always is set in fixed relation to the boring-bar. When the inserted key 11 is rotated the pin 3 also rotates but the graduated table 13 is not moved and the pointer 14 moving together with the key 11 will thus accurately indicate on the graduated table the amount by which the cutting tool 6 has been moved in or out in relation to the centre of the boring-bar. In order to prevent the graduated table from being incidentally moved round the key when the latter is removed from the spindle the bracket 15 is provided with a friction member 18. It is thus possible at a glance on the table to take note how much the tool has to be adjusted when next using the controlling key. The pointer 14 may at the beginning of an operation be set in relation to the graduated table by means of a collar 19 which can be securely fixed to the key 11 by a set screw 20.

Besides the simplified construction of the above described device according to the invention other advantages over similar devices hitherto known are obtained by enabling the tool to be secured to the tool holder in an absolutely accurate manner and combined herewith to be securely and exactly controlled, which two facts result in that a most accurate workmanship may be produced. If the device should be defective in one way or another, as hitherto has been the case in known devices, the same could not be used under practical working conditions in a modern machine tool. According to the invention the device above described has furthermore the advantage of being adaptable for boring-bars of different diameters but provided with slots of the same size, and it should be clear that an exchange of the device from one boring-bar to another may be performed in a comparatively short time. Several devices of the same kind not requiring much space may be arranged on one and the same boring-bar as shown by the above described example.

Having thus described my invention what I claim and desire to secure by Letters Patent is:—

1. An adjustable tool holder, including a boring bar formed with an elongated slot, one end of which is inclined and the other end of semi-cylindrical form having a central projection, a threaded pin mounted in the slot having a reduced section cooperating with the projection to prevent axial movement of the pin in the slot, a tool carrier slidably mounted in the slot having one end formed for threaded cooperation with the pin, said carrier having a tool receiving opening, means for removably securing a tool in the carrier, and a wedge member having an inclined face for cooperation with the inclined portion of the slot and removably secured therein, holding the tool carrier in cooperative engagement with the pin.

2. An adjustable tool holder, comprising a boring bar formed with an elongated slot having an inclined surface at one end, a threaded pin mounted in the other end of the slot and normally held against axial movement, a tool carrier slidably mounted in the slot having threaded cooperation with the pin and formed with a tool receiving opening, set screws mounted in the end of the tool carrier adjacent the inclined face of the slot for removably securing a tool in the carrier, whereby the tool may be positioned without respect to the relation of the carrier in the slot, a wedge member having one inclined face for cooperation with the inclined face of the slot adapted for insertion in the slot between the end and the tool carrier for forcing the tool carrier toward the threaded pin to provide a wearing surface for the carrier and to prevent the removal of the tool holding screws in assembled relation, and a locking screw in the bar for locking the wedge member in position.

In testimony whereof, I have signed my name to this specification in the presence of two subscribing witnesses.

GUSTAF HENNING LARSSON.

Witnesses:
 HJ. BRANZELE,
 G. PETERSSON.